United States Patent [19]

Goff

[11] Patent Number: 5,199,534
[45] Date of Patent: Apr. 6, 1993

[54] SHOPPING CART BRAKE

[76] Inventor: David Goff, 763 Menominee, Pontiac, Mich. 48341

[21] Appl. No.: 808,101

[22] Filed: Dec. 16, 1991

[51] Int. Cl.$^5$ .............................................. F16D 49/00
[52] U.S. Cl. .................................... 188/74; 16/35 R; 188/70 R; 280/33.994
[58] Field of Search ..................... 188/1.12, 20, 24.11, 188/24.12, 24.19, 70 R, 74; 280/33.994; 16/35 R

[56] References Cited

U.S. PATENT DOCUMENTS

| | | | |
|---|---|---|---|
| 524,527 | 8/1894 | Hall | 188/24.11 |
| 1,632,435 | 6/1927 | Darnell | |
| 1,731,312 | 10/1929 | Matheson | |
| 1,998,236 | 4/1935 | Herold | |
| 2,512,941 | 6/1950 | Johnson | |
| 2,658,587 | 11/1953 | Velazquez | 188/70 R X |
| 2,972,163 | 2/1961 | Ross et al. | 188/74 X |
| 3,117,653 | 1/1964 | Altherr | |
| 3,239,873 | 3/1966 | Fisher | |
| 3,298,467 | 1/1967 | Darnell | |
| 3,358,792 | 12/1967 | Proulx | |
| 3,493,085 | 2/1970 | Libhart | |
| 4,559,668 | 12/1985 | Black | 188/1.12 X |

FOREIGN PATENT DOCUMENTS

| | | | |
|---|---|---|---|
| 1677 | 12/1900 | United Kingdom | 188/24.11 |
| 1052780 | 12/1966 | United Kingdom | 16/35 R |
| 1524321 | 9/1978 | United Kingdom | 188/1.12 |
| 2187946 | 9/1987 | United Kingdom | 16/35 R |

Primary Examiner—George E. A. Halvosa
Attorney, Agent, or Firm—Lynn E. Cargill

[57] ABSTRACT

An improved shopping cart brake for attachment to the rear leg of a shopping cart is disclosed, the brake for preventing the rotation of a non-inflatable tire on the rear leg of the shopping cart. The shopping cart brake includes a connecting arm, which is removably and adjustably attached to the rear leg of the shopping cart. The brake also includes a split yoke, which is pivotally connected to the connecting arm. The split yoke has two braking flanges which engage and apply frictional force to the sides of the non-inflatable tire to prevent the tire from rotating. An actuator is also included, the actuator being integral with the split yoke and for applying force to the split yoke to engage the braking flanges with the sides of the non-inflatable tire. The shopping cart brake also includes an adjustable tension bar between the braking flanges which may be used to increase or decrease the frictional force the braking flanges apply to the non-inflatable tire. When the tension bar is adjusted properly, the braking flanges may be disengaged from the sides of the non-inflatable tire by merely moving the cart to the rear. A pop-up spring is also included. The pop-up spring is located between the connecting arm and the split yoke and biases the split yoke to a normal position where the braking flanges do not contact the sides of the non-inflatable tire when the brake is disengaged.

2 Claims, 1 Drawing Sheet

SHOPPING CART BRAKE

TECHNICAL FIELD

This invention pertains to cart brakes and particularly to a shopping cart brake.

BACKGROUND OF THE INVENTION

It has long been known to be a frustrating experience to use a shopping cart without brakes. Consumers who often take small children to the store have trouble unloading a cart as it often rolls on inclines or turns away from the vehicle making unloading the cart very frustrating. Additionally, the carts can roll into cars and cause substantial damage. Previously, other brakes have been used for caster wheels to prevent the wheels from rolling.

It would be advantageous to provide a device for a frustrated consumer to allow unloading a shopping cart without it rolling away and for parking the cart when not in use. It would be especially advantageous to have a shopping cart brake which could be used easily by the consumer so children and products could be unloaded from the cart without the cart causing damage to a vehicle, or rolling away. Many attempts have been made to produce brakes for caster wheels, but an improved design is needed for shopping cart brakes.

One attempt to produce a brake for caster wheels is disclosed in U.S. Pat. No. 3,493,085 issued Feb. 3, 1970 to Libhart. A positive locking caster brake is disclosed which is operated by a foot lever, which when depressed forces a pivoted brake shoe onto the wheel surface which touches the ground. The foot lever forces a brake into an overcenter position which pivots inwardly to apply braking pressure to the caster wheel.

U.S. Pat. No. 3,358,792 issued Dec. 19, 1967 to Proulx discloses a caster brake which has the brake mechanism mounted inside the caster horn mechanism and causes a cam to engage at least one plate which applies braking force to a wheel.

U.S. Pat. No. 3,298,467 issued Jan. 17, 1967 to Darnell discloses a caster brake for engaging the wheel surface which touches the ground. The brake is a one-piece plate projecting outwardly from the top of the caster above the wheel. The plate has a pair of generally parallel splits separating the plate into two outward portions with a tongue in between for catching into a resiliently penetrable tire.

U.S. Pat. No. 3,239,873 issued Mar. 15, 1966 to Fisher discloses a caster brake which brakes the wheel against rotation about its axis and pivotal movement about a vertical axis. A braking member applies force to the wheel surface which touches the ground.

U.S. Pat. No. 3,117,653 issued Jan. 14, 1964 to Altherr discloses a brake mechanism for a shopping cart. The brake is applied to two rear wheels of the cart simultaneously. The brake element is a bolt which is attached to a mounting apparatus and the bolt is positioned against the wheel by means of two nuts and contacts the wheel surface which touches the ground.

U.S. Pat. No. 2,512,941 issued Jun. 27, 1950 to Johnson discloses a locking type caster which includes a single lock for stopping both radial and pivotal movement for scaffolds. A brake lever pivots the caster wheel against a pivot causing the tire to bear against a caster housing.

U.S. Pat. No. 1,998,236 issued Apr. 16, 1935 to Herold discloses a brake for casters which frictionally engages the periphery of the wheel surface which touches the ground. This brake has a ratchet design for engaging the braking member.

U.S. Pat. No. 1,731,312 issued Oct. 15, 1929 to Matheson discloses a caster and brake. The braking member contacts the wheel surface which touches the ground.

U.S. Pat. No. 1,632,435 issued Jun. 14, 1927 to Darnell discloses a swivel caster with a brake and lock. The brake grips the side plates of the wheel to stop the wheel from moving.

None of the above designs of caster or cart wheel brakes is ideal for shopping carts. Either the brake wears down the outer surface of the wheel and abrades it or the brake is cumbersome and/or less than ideally effective.

It is an object of the present invention to provide an improved shopping cart brake.

It is a further object of the present invention to provide an improved shopping cart brake that does not act upon and wear down the outer surface of the cart wheel.

It is another object of the present invention to provide an improved shopping cart brake that applies adjustable force to the side of the cart wheel and that can be released by merely moving the cart to the rear and that can be released without positive operator action upon the brake.

SUMMARY OF THE INVENTION

In accordance with the preferred embodiment of the invention, these and other objects and advantages are addressed as follows.

The present invention provides an improved shopping cart brake for attachment to the rear leg of a shopping cart and which prevents rotation of a non-inflatable tire on the rear leg of the shopping cart. The shopping cart brake includes a connecting arm, which is removably and adjustably attached to the rear leg of the shopping cart. The brake also includes a split yoke, which is pivotally connected to the connecting arm. The split yoke has two braking flanges which engage and apply frictional force to the sides of the non-inflatable tire to prevent the tire from rotating. An actuator is also included, the actuator being integral with the split yoke and for applying force to the split yoke to engage the braking flanges with the sides of the non-inflatable tire. The shopping cart brake also includes an adjustable tension bar between the braking flanges which may be used to increase or decrease the frictional force the braking flanges apply to the non-inflatable tire. When the tension bar is properly adjusted, the braking flanges may be disengaged from the sides of the non-inflatable tire by merely moving the cart to the rear. A pop-up spring is also Included. The pop-up spring is located between the connecting arm and the split yoke and biases the split yoke to a normal position where the braking flanges do not contact the sides of the non-inflatable tire when the brake is disengaged.

The above design discloses an improved shopping cart brake not disclosed by the prior art.

BRIEF DESCRIPTION OF THE DRAWINGS

The nature and extent of the present invention will be clear from the following detailed description of the particular embodiments thereof, taken in conjunction with the appendant drawings, in which.

DETAILED DESCRIPTION OF THE INVENTION

Figure 1:
FIG. 1 is a perspective view of the brake in position, attached to the leg of a shopping cart.
Figure 2:
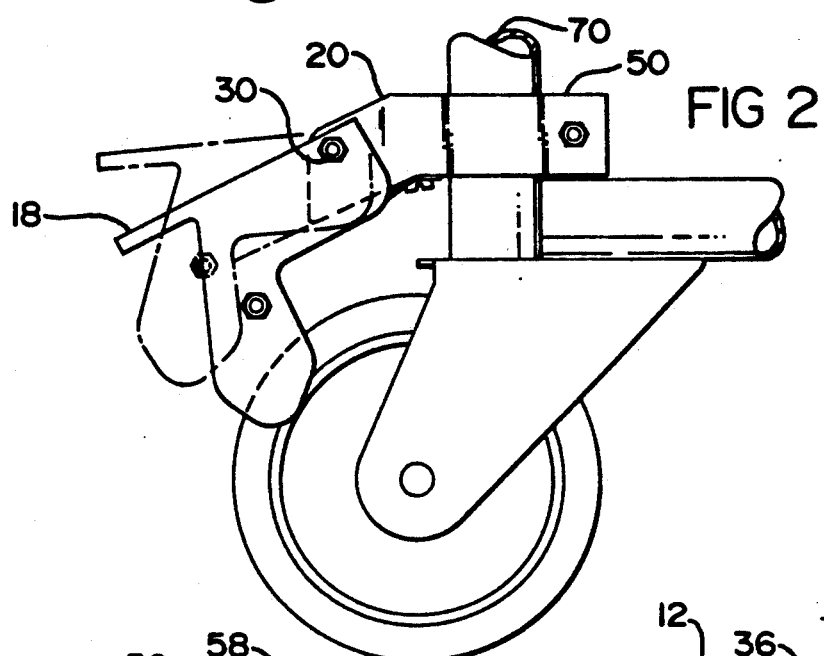
FIG. 2 is a side view of the brake assembly in an engaged position and in a disengaged position.
Figure 3:
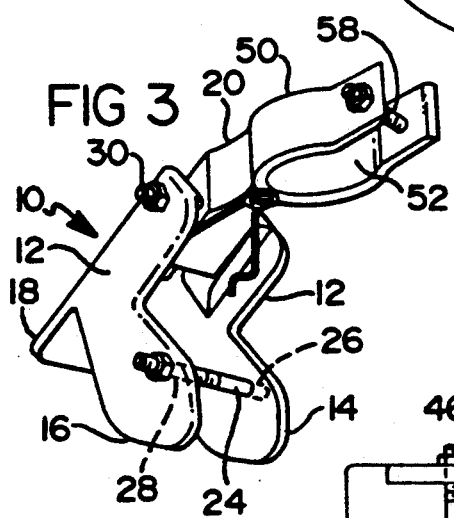
FIG. 3 is a bottom perspective view of the brake assembly illustrating the preferred embodiment.

With reference to FIG. 1 of the drawings, a shopping cart brake assembly constructed in accordance with the present invention is generally indicated by reference number 10. As shown in FIG. 3, brake assembly 10 includes a split yoke component 12 having two spaced apart sides either side having an underside portion, and said split yoke including two braking flanges 14 and 16 integral with and extending from either side of said split yoke, for applying frictional force to the sides of a non-inflatable tire. Referring now to FIG. 2, the brake assembly also includes an actuator 18 for positioning the braking flanges over the sides of the tire. The actuator 18 is a flat surface integral with the split yoke 12 to receive a force applied by the foot of an operator. In an alternative embodiment, the actuator could conceivably be designed for use in combination with a hand activated actuator.

As shown in FIG. 3, the split yoke 12 is pivotally connected to a connecting arm 20. Preferably, the connecting arm is insertable in the space between either side of the split yoke. The split yoke 12 also includes a hinge 30 attached to the split yoke 12 and connecting arm 20. The hinge 30 serves the purpose of pivotally connecting the split yoke 12 and the connecting arm 20.

Figure 5:
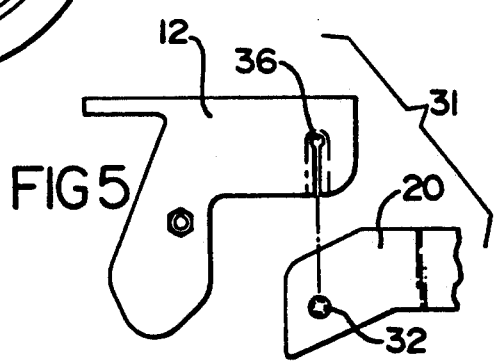
FIG. 5 is a side view of the snap lock hinge on the split yoke and connecting arm.

As shown in FIG. 5, the hinge 30 may be a snap lock type hinge. The snap lock hinge includes at least one nipple component shown at 32 located on the connecting arm 20 and at least one complementary nipple-receiving portion 36 located on the split yoke 12. In one embodiment, the hinge has two nipple components located on either side of the connecting arm, and two complementary nipple-receiving portions located on either side of the split yoke. Alternatively the nipple-receiving portions may be located on either side of the connecting arm and the nipple portions located on the split yoke. When the connecting arm is positioned between either side of the split yoke the complementary receiving portions snap over the nipple portions. In this manner, the split yoke 12 and the connecting arm 20 are hingedly connected.

Figure 4:
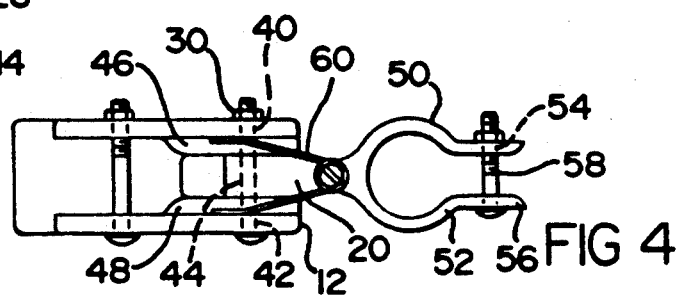
FIG. 4 is a bottom partial view of the brake assembly.

In a second embodiment, as shown in FIG. 4, the hinge 30 which connects the split yoke 12 and connecting arm 20 may be a fastening means positioned through mated apertures designated at 40 and 42 located in the split yoke and at aperture 44 in the connecting arm 20. Said hinge 30, may comprise a bolt and nut.

Looking back to FIG. 3, the brake assembly also includes an adjusting means 24 for adjusting the force applied by the braking flanges 14 and 16 to the sides of the non-inflatable tire. The adjusting means 24 may be a tension bar insertable through apertures 26 and 28 located in each of the braking flanges 14 and 16. The tension bar can be tightened and loosened to increase and decrease the force applied by the braking flanges to the non-inflatable tire. In one embodiment, the tension bar includes a nut and bolt insertable through the apertures 26 and 28, which is adjusted by tightening the bolt against the nut. In another embodiment, the tension bar is a bolt alone, insertable into a threaded aperture for tightening and loosening within the threaded aperture.

As shown in FIGS. 2 and 3, the brake assembly is attached to the leg of the shopping cart 70 by a clamping means 50 integral with the connecting arm 20. As shown in FIG. 4, the clamping means includes an adjustable ring member 52 for encircling the leg of the shopping cart in order to removably attach the brake assembly to the cart. The ring member 52 may include two apertures 54 and 56, one aperture being located on the opposite side of the ring from the other. The apertures receive an adjuster 58, which serves to tighten and loosen the ring member 52 about the leg of the shopping cart. In a preferred embodiment the adjuster is a nut and bolt.

Referring now to FIG. 4, the split yoke 12 also includes two ledges 46 and 48, formed on either underside portion of the split yoke. The ledges are located below the apertures 40 and 42 in the split yoke. The purpose of the ledges is explained hereinbelow.

As shown in FIG. 4, attached to the connecting arm 20 is a return spring 60, for returning the braking flanges from a braking or engaged position to a neutral or disengaged position. In a preferred embodiment the return spring 60 is attached to the connecting arm 20 of the split yoke 12. In one aspect of the invention, the return spring may be a V-shaped member, where either leg of the V engages one of the narrow ledges 46 and 48 located on either side of the split yoke 12. The return spring is preferably a flexible metal but may be any other suitable material. A novel feature of the invention is that the brake is automatically disengaged by the rearward movement of the car. The return spring keeps the brake assembly from rubbing on the tire when the assembly is in a disengaged position. Other return spring configurations which are known to those skilled in the art could be substituted. The return spring is useful to prevent wear of the tire which would result with constant contact between the braking flanges and the tire.

The above-described brake assembly may be formed of metal or may be injection molded or extruded plastic such as polypropylene, nylon, thermoplastic, any mixture thereof or any other suitable material. The braking flanges are adjustable to accommodate any standard wheel or caster used on a shopping cart.

While the best mode for constructing the invention has been described herein in detail, those familiar with the art to which this invention relates will recognize various alternative ways of carrying out the invention as defined by the following claims. Accordingly, the scope of my invention is to be limited only by the following claims.

What is claimed is:

1. A shopping cart brake for attachment to a rear leg of a shopping cart to prevent a non-inflatable tire on the rear leg from rotating, the brake comprising:
   (a) a connecting arm for removably and adjustably attaching the brake to the rear leg of the shopping cart;
   (b) a split yoke, which is pivotally connected to the connecting arm and which includes two braking flanges for engaging and applying frictional force to the sides of the non-inflatable tire to prevent the tire from rotating;

(c) an actuator, integral with the split yoke, for applying force to the split yoke, thereby engaging the braking flanges with the sides of the non-inflatable tire; and (d) an adjustable tension bar, located between the braking flanges, for increasing or decreasing the frictional force the braking flanges apply to the sides of the non-inflatable tire, wherein the tension bar may be adjusted so that the braking flanges may be disengaged from the sides of the non-inflatable tire by merely moving the cart rearwardly.

2. The brake assembly of claim 1, wherein the brake assembly further comprises a return means, for preventing frictional contact between the braking flanges and the tire when the brake assembly is in a disengaged position.

* * * * *